(12) United States Patent
Lee

(10) Patent No.: US 10,063,538 B2
(45) Date of Patent: Aug. 28, 2018

(54) SYSTEM FOR SECURE LOGIN, AND METHOD AND APPARATUS FOR SAME

(71) Applicant: SIMPLEX INTERNET CO., LTD., Seoul (KR)

(72) Inventor: Jae Suk Lee, Seoul (KR)

(73) Assignee: SIMPLEX INTERNET CO., LTD., Seoul (KR)

( * ) Notice: Subject to any disclaimer, the term of this patent is extended or adjusted under 35 U.S.C. 154(b) by 120 days.

(21) Appl. No.: 15/033,890

(22) PCT Filed: Nov. 5, 2014

(86) PCT No.: PCT/KR2014/010578
§ 371 (c)(1),
(2) Date: May 2, 2016

(87) PCT Pub. No.: WO2015/069018
PCT Pub. Date: May 14, 2015

(65) Prior Publication Data
US 2016/0261582 A1    Sep. 8, 2016

(30) Foreign Application Priority Data

Nov. 5, 2013  (KR) .......... 10-2013-0133401

(51) Int. Cl.
*H04L 29/06* (2006.01)
*G06F 21/31* (2013.01)
(Continued)

(52) U.S. Cl.
CPC ............ *H04L 63/083* (2013.01); *G06F 21/31* (2013.01); *G06F 21/32* (2013.01); *G06F 21/40* (2013.01);
(Continued)

(58) Field of Classification Search
CPC ........ H04L 63/083; G06F 21/31; G06F 21/32
See application file for complete search history.

(56) References Cited

U.S. PATENT DOCUMENTS 9,477,823 B1 * 10/2016 Ott .................... G06F 21/316

FOREIGN PATENT DOCUMENTS

JP    2011008544 A    1/2011
KR    10-0677669 B1    2/2007
(Continued)

OTHER PUBLICATIONS

PCT International Application No. PCT/KR2014/010578, International Search Report dated Feb. 1, 2015, 2 pages.

*Primary Examiner* — Anthony Brown
(74) *Attorney, Agent, or Firm* — Envision USA Inc.

(57) ABSTRACT

A system for secure login, and a method and an apparatus for the same are disclosed. The system for secure login comprises: an authentication unit; a first device for transmitting, to the authentication unit, login information inputted via an inputting unit and input timing information indicating input timing of characters corresponding to at least a part of the inputted login information; and a second device for obtaining a typing sound generated when a user types the characters using the inputting unit and transmitting, to the authentication unit, audio information comprising the typing sound. The authentication unit authenticates the login information on the basis of the input timing information received from the first device and the audio information received from the second device. Accordingly, an illegal access of a user is fundamentally blocked and thereby, credibility of login security can be increased.

16 Claims, 10 Drawing Sheets

(51) Int. Cl.
 *G06F 21/83* (2013.01)
 *G06F 21/32* (2013.01)
 *G06F 21/40* (2013.01)
 *H04W 12/06* (2009.01)

(52) U.S. Cl.
 CPC ............ *G06F 21/83* (2013.01); *H04W 12/06*
 (2013.01); *G06F 2221/2151* (2013.01); *H04L*
 *63/102* (2013.01); *H04L 2463/121* (2013.01)

(56) References Cited

FOREIGN PATENT DOCUMENTS

KR  10-2009-0066086 A   6/2009
KR  10-2013-0093802 A   8/2013

* cited by examiner

SYSTEM FOR SECURE LOGIN, AND METHOD AND APPARATUS FOR SAME

CROSS-REFERENCE TO RELATED APPLICATIONS

This application is the National Stage filing under 35 U.S.C. 371 of International Application No. PCT/KR2014/010578, filed on Nov. 5, 2014, which claims the benefit of Korean Patent Application No. 10-2013-0133401, filed on Nov. 5, 2013, the contents of which are all hereby incorporated by reference herein in their entirety.

BACKGROUND OF THE INVENTION

Field of the Invention

The present invention relates to a secure login system, method, and apparatus and, more particularly, to a secure login technology capable of guaranteeing high security by verifying whether a login attempt is a login attempt made by a legitimate user based on timing when the letters of at least some of login information obtained from a plurality of devices when a user logs in are inputted and authenticating the login information.

Discussion of the Related Art

As infrastructure for a wireless Internet or wired Internet has recently been constructed and ultrahigh speed data communication is made possible based on the infrastructure, most part of services performed offline in the past has been replaced with online services. It is expected that online services will be further expanded in the future because they have an advantage in that a user can be provided with a required service without being limited to the time and space.

A representative example of such online services includes the Internet service based on a web. Most of sites are equipped with a login function for authenticating and managing a user who uses services when using the Internet service. For example, when a user terminal accesses a website server, the website server requests login information of the user, such as a user ID and a password, from the user terminal, associates the login information transmitted by the user terminal with member registration information, and stores the login information associated with the member registration information in a database, thereby registering the login information. Thereafter, the user terminal may log in to a service provided by the website server using the registered login information and may be provided with a special service provided to members.

As described above, in online services, a login process is one of the most basic and important processes. In such online services, unrestricted copy is possible without a loss of information due to the nature of digital information despite the aforementioned various advantages. Accordingly, the online services may be exposed to illegal behaviors, such as information leakage, relatively easily through hacking.

In particular, in online services, a user ID is the most basic identifier for identifying a user, associated with almost all pieces of major information of a user, and managed by a database. Accordingly, if a user ID leaks to a person who has an impure intention, fatal damage may be generated.

For example, in an electronic commerce site, a user ID is the most basic delimiter for identifying a person, that is, the subject who purchases articles in the corresponding electronic commerce site. The user ID functions as an absolute key capable of extracting all of pieces of electronic commerce information, including personal information, e-mail, financial transaction information, posting information, and the telephone number of a corresponding user. Accordingly, if a user ID and a password leak, there is a high probability that fatal damage to a corresponding user may be generated because the corresponding information is illegally abused.

Accordingly, many security solution companies are currently developing and releasing various types of information leakage prevention systems. Recent information security systems have been focused on preventing the leakage of an ID and password through hacking or phishing from a terminal or a server. However, as information security systems are advanced, hacking technologies are also advanced faster. Currently, there are many hacking tools and schemes for draining personal information, such as IDs and passwords.

Accordingly, if a security specialist of the highest level does not directly manage devices, communication, and systems related to online services, no one can assure that his or her devices, communication, and systems are perfectly protected from hacking. This may be a burden on both an online service provider and a user because reliability of online services is affected.

SUMMARY OF THE INVENTION

An object of the present invention is to a secure login system, method, and apparatus, which are capable of guaranteeing high security by verifying whether a login attempt is a login attempt made by a legitimate user based on timing when the letters of at least some of login information obtained from a plurality of devices when a user logs in are inputted and authenticating the login information.

In an aspect, there is provided a secure login system. The secure login system includes an authentication unit, a first device configured to send login information received through an input unit and input timing information indicative of timing when letters corresponding to at least some of the login information are inputted to the authentication unit, and a second device configured to obtain typing sounds generated when a user types the letters using the input unit and to send audio information including the typing sounds to the authentication unit. The authentication unit authenticates the login information based on the input timing information received from the first device and the audio information received from the second device.

The first device may send a letter input detection signal indicating that the input of a letter has been detected to the authentication unit in real time whenever the input of the letter is detected in at least one login information item input window for inputting the login information when the user presses a key of the input unit. The authentication unit may generate first letter input timing pattern information of letters corresponding to at least some of the login information based on a plurality of letter input detection signals received from the first device in real time.

The first device may generate first letter input timing pattern information of letters corresponding to at least some of the login information based on the input of the letters detected in at least one login information item input window for inputting the login information when the user presses keys of the input unit and send the first letter input timing pattern information to the authentication unit.

The authentication unit may compare first letter input timing pattern information generated based on the input timing information received from the first device with second letter input timing pattern information generated based on the audio information received from the second device and authenticate the login information by querying a database about the login information if the first letter input timing pattern information is identical with the second letter input timing pattern information according to a predetermined criterion.

The authentication unit may calculate a time interval between at least two letters included in first letter input pattern information and a time interval between corresponding at least two letters included in second letter input pattern information and compare the time interval between the at least two letters included in the first letter input pattern information with the time interval between the at least two letters included in the second letter input pattern information. The authentication unit may analyze the wavelength of the audio information received from the second device and generate the second letter input timing pattern information based on the analyzed wavelength.

The authentication unit may authenticate the second device prior to the input of the login information and send a form indicating that the login information needs to be inputted to the first device after the authentication of the second device is successfully completed. The letters of at least some of the login information may include letters inputted to an input window of a user ID and correspond to a predetermined number.

The authentication unit may calculate input time intervals between the letters based on the input timing information received from the first device, may calculate the wavelength of a sound source based on the audio information received from the second device, may determine that a legitimate user has attempted login if each of the input time intervals between the letters is proportional to a length of the wavelength of the sound source, and may attempt to authenticate the login information.

In another aspect, there is provided a secure login method. The secure login method may include sending, by a first device, login information received through the input unit of the first device and input timing information indicative of timing when letters corresponding to at least some of the login information are inputted to an authentication unit, obtaining, by a second device, typing sounds generated when a user types the letters using the input unit, sending audio information including the typing sounds to the authentication unit, and authenticating, by the authentication unit, the login information based on the input timing information received from the first device and the audio information received from the second device.

Sending the input timing information to the authentication unit may include sending a letter input detection signal indicating that the input of a letter has been detected to the authentication unit in real time whenever the input of the letter is detected in at least one login information item input window for inputting the login information when the user presses a key of the input unit. Authenticating the login information may include generating first letter input timing pattern information of letters corresponding to at least some of the login information based on a plurality of letter input detection signals received from the first device in real time.

Sending the input timing information to the authentication unit may include generating first letter input timing pattern information of letters corresponding to at least some of the login information based on the input of the letters detected in at least one login information item input window for inputting the login information when the user presses keys of the input unit and sending the first letter input timing pattern information to the authentication unit.

Authenticating the login information may include comparing first letter input timing pattern information generated based on the input timing information received from the first device with second letter input timing pattern information generated based on the audio information received from the second device and authenticating the login information by querying a database about the login information if the first letter input timing pattern information is identical with the second letter input timing pattern information according to a predetermined criterion.

The authentication unit may calculate a time interval between at least two letters included in first letter input pattern information and a time interval between corresponding at least two letters included in second letter input pattern information and compare the time interval between the at least two letters included in the first letter input pattern information with the time interval between the at least two letters included in the second letter input pattern information.

The secure login method may further include authenticating, by the authentication unit, the second device prior to the input of the login information and sending a form indicating that the login information needs to be inputted to the first device after the authentication of the second device is successfully completed. The letters of at least some of the login information may include letters inputted to an input window of a user ID and correspond to a predetermined number.

The authentication unit may calculate input time intervals between the letters based on the input timing information received from the first device, may calculate the wavelength of a sound source based on the audio information received from the second device, may determine that a legitimate user has attempted login if each of the input time intervals between the letters is proportional to a length of the wavelength of the sound source, and may attempt to authenticate the login information.

In yet another aspect, there is provided a secure login apparatus. The secure login apparatus may include a first communication unit configured to receive login information received through the input unit of a first device and input timing information indicative of timing when letters corresponding to at least some of the login information are inputted from the first device, a second communication unit configured to receive audio information including typing sounds generated when a user types the letters using the input unit from a second device, and a login authentication unit configured to authenticate the login information based on the input timing information received from the first device and the audio information received from the second device.

The first communication unit may receive a letter input detection signal indicating that the input of a letter has been detected from the first device in real time whenever the input of the letter is detected in at least one login information item input window for inputting the login information when the user presses a key of the input unit. The login authentication unit may generate first letter input timing pattern information of letters corresponding to at least some of the login information based on a plurality of letter input detection signals transmitted from the first device to the first communication unit in real time.

The login authentication unit may compare first letter input timing pattern information generated based on the input timing information received from the first device with second letter input timing pattern information generated based on the audio information received from the second device and authenticate the login information by querying a database about the login information if the first letter input timing pattern information is identical with the second letter input timing pattern information according to a predetermined criterion.

The login authentication unit may calculate a time interval between at least two letters included in first letter input pattern information and a time interval between corresponding at least two letters included in second letter input pattern information and compare the time interval between the at least two letters included in the first letter input pattern information with the time interval between the at least two letters included in the second letter input pattern information.

The letters of at least some of the login information may include letters inputted to the input window of a user ID and correspond to a predetermined number. The login authentication unit may authenticate the second device prior to the input of the login information and control the first communication unit after the authentication of the second device is successfully completed so that the first communication unit sends a form indicating that the login information needs to be inputted to the first device.

The login authentication unit may calculate input time intervals between the letters based on the input timing information received from the first device, may calculate the wavelength of a sound source based on the audio information received from the second device, may determine that a legitimate user has attempted login if each of the input time intervals between the letters is proportional to a length of the wavelength of the sound source, and may attempt to authenticate the login information.

In further yet another aspect, there is provided a secure login apparatus. The secure login apparatus receives login information from a first device and authenticates the login information and may include a first authentication unit configured to authenticate a second device, a communication unit configured to send login information item input windows for inputting the login information to the first device to the first device, receive first information indicative of timing when letters inputted to at least one of the login information item input windows are inputted from the first device, and receive second information including typing sounds generated when letters inputted to at least one of the login information item input windows are typed from the authenticated second device, and a second authentication unit configured to authenticate the login information based on the first information and the second information.

In still yet another aspect, there is provided a secure login method. In a method for authenticating login information received from a first device, the secure login method may include authenticating a second device, sending login information item input windows for inputting the login information to the first device, receiving first information indicative of timing when letters inputted to at least one of the login information item input windows are inputted from the first device, receiving second information including typing sounds generated when letters inputted to at least one of the login information item input windows are typed from the authenticated second device, and authenticating the login information based on the first information and the second information.

In further yet another aspect, there is provided a secure login system. The secure login system may include an authentication unit, a first device configured to send login information to the authentication unit and to send first information indicative of timing when letters corresponding to at least some of the login information are inputted to the authentication unit when the login information is inputted, a second device configured to send second information including typing sounds generated when the letters of at least some of the login information are typed to the authentication unit when a user inputs the login information, and a relay unit configured to relay communication signals between the authentication unit and the second device. The authentication unit may authenticate the login information based on the first information and the second information.

The relay unit may receive an audio information request signal from the authentication unit, may request audio information from the second device in response to the audio information request signal, and may send the audio information received from the second device to the authentication unit.

DETAILED DESCRIPTION OF THE EMBODIMENTS

Figure 1:
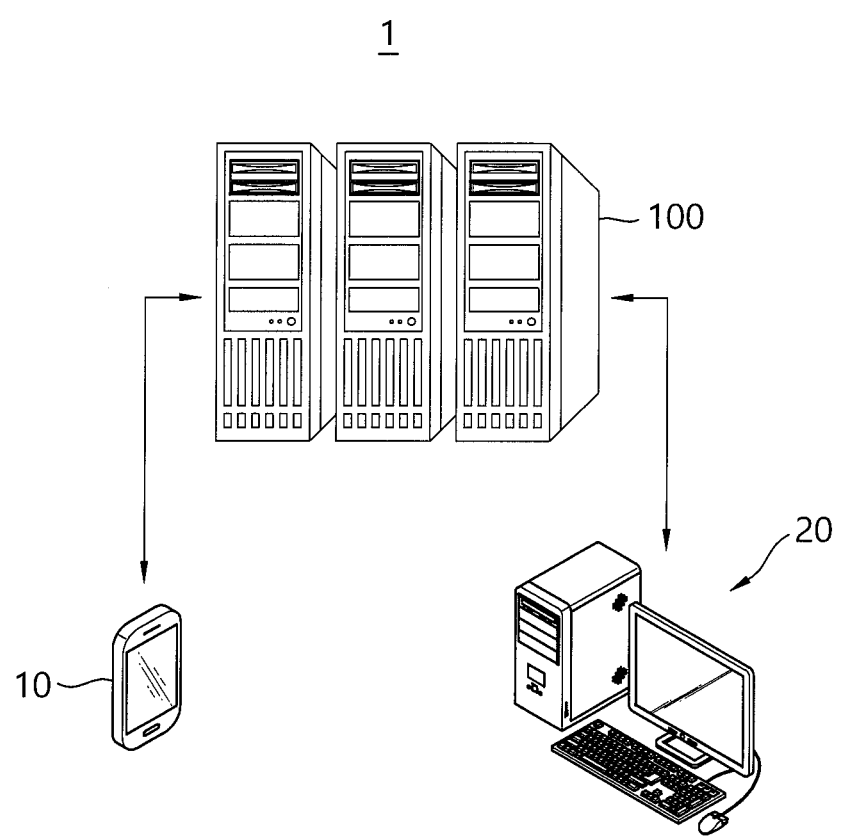
FIG. 1 is a block diagram showing the configuration of a secure login system according to an embodiment of the present invention.

The present invention may be modified in various ways and may be implemented to have several embodiments. Specific embodiments are illustrated in the drawings and are described in detail.

It is however to be understood that the present invention is not intended to be limited to the specific embodiments and the present invention includes all transforms, equivalents, and substitutions which fall within the spirit and technical scope of the present invention.

Terms, such as the first and the second, may be used to describe various elements, but the elements should not be restricted by the terms. The terms are used to only distinguish one element from the other element. For example, a first element may be named a second element without departing from the scope of the present invention. Likewise, a second element may be named a first element. The term "and/or" includes a combination of a plurality of related and illustrated items or any one of a plurality of related and described items.

When it is said that one element is "connected" or "coupled" to the other element, it should be understood that one element may be directly connected or coupled" to the other element, but a third element may exist between the two elements. In contrast, when it is described that one element is "directly connected" or "directly coupled" to the other element, it should be understood that a third element does not exist between the two elements.

The terms used in this application are used to only describe specific embodiments and are not intended to restrict the present invention. An expression of the singular number includes an expression of the plural number unless clearly defined otherwise in the context. In this application, terms, such as "comprise" or "have", are intended to designate that characteristics, numbers, steps, operations, elements, or parts which are described in the specification, or a combination of them exist, and should not be understood that they exclude the existence or possible addition of one or more other characteristics, numbers, steps, operations, elements, parts, or combinations of them in advance.

Unless defined otherwise, all terms used herein, including technical terms or scientific terms, have the same meanings as those generally understood by persons of ordinary skill in the technical field to which the present invention pertains. The terms, such as terms that are generally used and defined in dictionaries, should be construed as having meanings identical to those that are used in the context of related technology, and should not be construed as having ideal or excessively formal meanings unless explicitly defined otherwise.

Hereinafter, some embodiments of the present invention are described in more detail with reference to the accompanying drawings. In describing the present invention, in order to help general understanding, the same reference numerals are used to denote the same elements throughout the drawings, and a redundant description of the same elements is omitted.

FIG. 1 is a block diagram showing the configuration of a secure login system according to an embodiment of the present invention.

As shown in FIG. 1, the secure login system may include a first device 20, a second device 10, and an authentication server 100 operating in conjunction with the first device 20 and the second device 10.

The first device 20 may mean a network device which accesses the authentication server 100 over a wired wireless Internet and attempts to be provided with a web service based on login authentication by the authentication server 100. For example, the first device 20 may be a PC or laptop computer. The first device 20 may include an input unit 20a for inputting information. For example, the input unit 20a may be a keyboard or touch screen.

In the present embodiment, in some portions, the first device 20 may be assumed to be the PC of a user and the input unit 20a of the first device 20 may be assumed to be a keyboard connected to a PC. This is only an example of an embodiment and the present invention is not limited thereto.

A user may be provided with a service by logging in to a web service using the first device 20. Although not shown, the authentication server 100 operates in conjunction with a web server providing a web service and is responsible for the login authentication of devices that access the web server. The web service may include all types of services requiring login, such as electronic commerce transactions, Internet banking, Internet education, portal sites, and SNS.

The second device 10 may be a device which accesses the authentication server 100 over a wireless network, for example, a mobile network, which is authenticated, and which obtains audio information to be used in the login authentication of the first device 20 and sends the audio information to the authentication server 100. For example, the first device 20 may be a portable device which can access a mobile network, such as a smart phone, a tablet PC, or a mobile phone. In the present embodiment, in some portions, the second device 10 is assumed to be a smart phone. This is only an example of an embodiment and the present invention is not limited thereto.

When inputting login information using the input unit 20a of the first device 20, a user places the second device 10 near the input unit 20a of the first device 20. The second device 10 may obtain a typing sound generated from the input unit 20a when a user inputs login information using the input unit 20a of the first device 20, may convert the obtained typing sound into an audio file capable of being transmitted over a wireless Internet, and may send the audio file to the authentication server 100.

The second device 10 may be equipped with an application in order to perform a function of the second device 10 according to an embodiment of the present invention, for example, in order to obtain a typing sound or send audio information to the authentication server 100. The application may operate using resources of the second device 10, such as a processor and memory.

The application may be provided from the authentication server 100 or a third mobile web store to the second device 10. For example, when the second device 10 accesses the authentication server 100 or a specific mobile web store, an installation icon for installing the application may be displayed on the second device 10. In this case, when the second device 10 selects the installation icon in response to an instruction from a user, the application may be installed in the second device 10. In some embodiments, when the second device 10 accesses the authentication server 100, the application may be automatically installed in the second device 10.

The authentication server 100 operates in conjunction with the first device 20 and the second device 10 over a wired and wireless communication network and may perform secure authentication on the devices. For example, the authentication server 100 may perform secure authentication on the login information of the first device 20 based on information received from the first device 20 and audio information received from the second device 10 through another route in order to authenticate the first device 20.

In general, when a PC or the first device 20 accesses and logs in to the Internet, it transfers login information, for example, a user ID and a password to the authentication server 100. The authentication server 100 compares the login information from the first device 20 with login information stored in a database 130 and allows the first device 20 to log in to the authentication server 100 if the two types of information are the same.

Recently, however, user IDs and passwords, that is, login information, leak out frequently through hacking. In particular, unlike a password, a user ID is not usually encrypted and stored in a server and is likely to be exposed to illegal leakage because security for the user ID is relatively weak. Accordingly, an illegal user who has illegally obtained a user ID may frequently access the authentication server 100 directly or using an ID stealing program. In this case, the illegal user or ID stealing program finds out even a password using a password generator and can log in to a service and thoughtlessly steal user information although the illegal user or ID stealing program is not an actual user.

The authentication server 100 according to an embodiment of the present invention receives login information inputted by a user and input timing information indicative of timing when letters corresponding to at least some of the login information are entered from the first device 20. In some embodiments, the authentication server 100 may receive audio information regarding a sound generated when the user types the letters of the at least some of the login information (i.e., the letters of a user ID) from the second device 10 when the user inputs the login information. The authentication server 100 may first verify whether the login information received from the first device 20 is information legitimately inputted by the user by comparing the input timing information received from the first device 20 with the audio information received from the second device 10 and then perform authentication on the login information.

The login information may mean a user ID or password for login. Information corresponding to the letters of at least some of the login information may be a user ID or a portion of the user ID. In the present embodiment, the information corresponding to the letters of at least some of the login information will be illustrated as being a user ID, but the present invention is not limited thereto. That is, the authentication server 100 previously verifies whether a user ID has been inputted by a legitimate user based on input timing information and audio information corresponding to the user ID or a portion of the user ID.

As described above, the authentication server 100 verifies whether login information used in the login authentication of the first device 20 has been inputted by a legitimate user based on a typing sound obtained by the second device 10. Accordingly, an embodiment of the present invention can easily handle an illegal login attempt attributable to the leakage of a user ID and significantly improve reliability in the security of login authentication.

Figure 2:
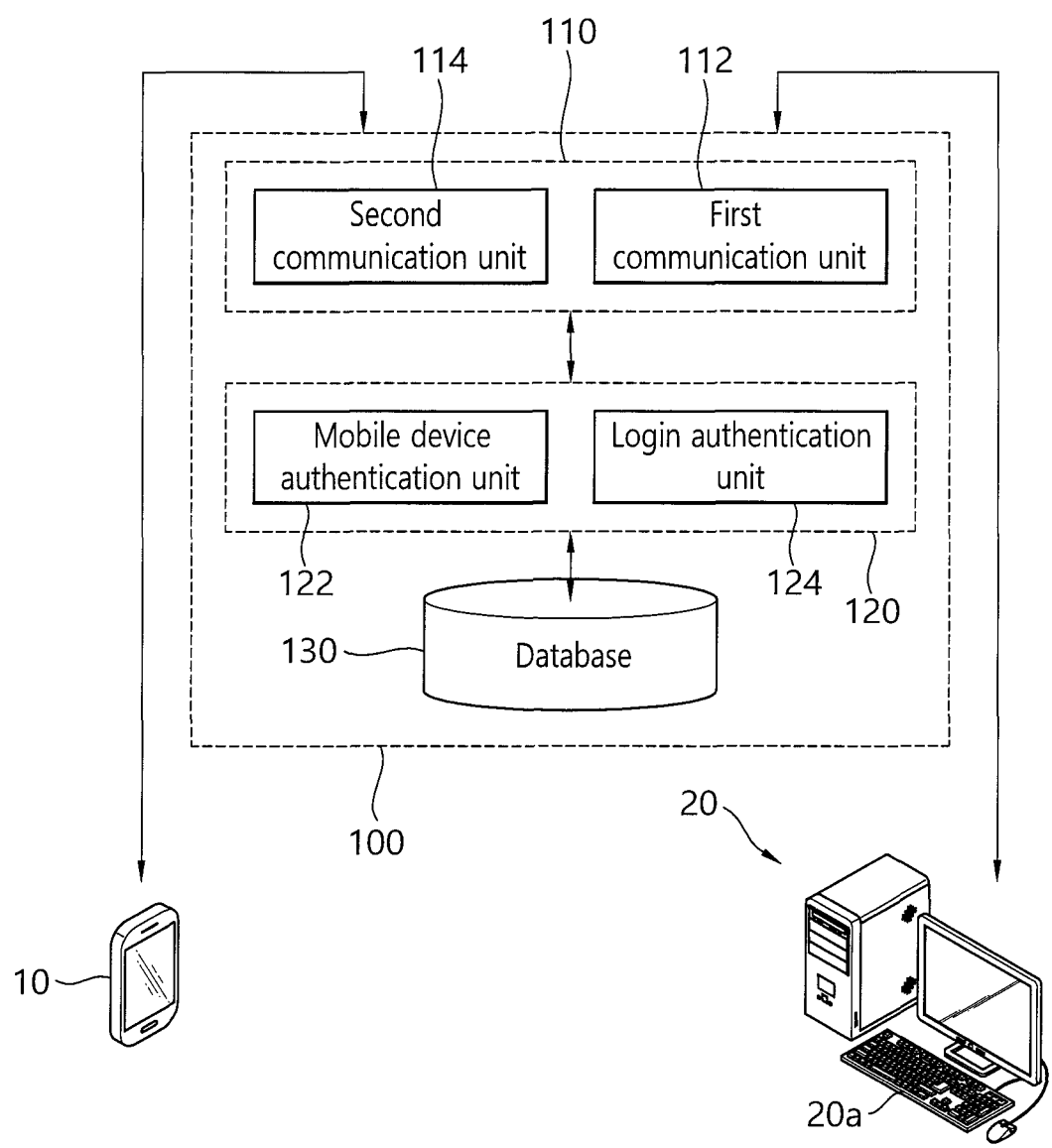
FIG. 2 is a block diagram showing the configuration of an authentication server shown in FIG. 1.

FIG. 2 is a block diagram showing the configuration of the authentication server 100 shown in FIG. 1.

As shown in FIG. 2, the authentication server 100 may include a communication unit 110, an authentication unit 120, the database 130 and so on. The elements of the authentication server 100 may operate in conjunction with each other, if necessary.

The communication unit 110 may communicate with the first device 20 and the second device 10 over a wired or wireless communication network. The communication unit 110 may include a first communication unit 112 and a second communication unit 114.

The first communication unit 112 may communicate with the first device 20 over a first communication network. For example, the first communication unit 112 may communicate with a PC, that is, the first device 20 of a user, over a wired network. The first communication unit 112 may receive login information inputted to the first device 20 in order for a user to log in to the first device 20, for example, and the letters of at least some of the login information, for example, information indicative of timing when a user ID was entered, from the first device 20 and transfer the login information and the letters to the authentication unit 120.

The second communication unit 114 may communicate with the second device 10 over a second communication network. For example, the second communication unit 114 may communicated with a smart phone, that is, the second device 10, over a mobile network. The second communication unit 114 may send or receive a signal so that the authentication unit 120 operates in conjunction with the second device 10 when the second device 10 is authenticated, for example. Furthermore, the second communication unit 114 may receive audio information to be used for the authentication of the first device 20, for example, a typing sound generated when the letters of a user ID are entered from the second device 10 and transfer the audio information to the authentication unit 120.

The authentication unit 120 authenticates the first device 20 and the second device 10. For example, the authentication unit 120 may authenticate the second device 10 and perform secure authentication on the first device 20 based on audio information received from the authenticated second device 10 and login information and input typing information received from the first device 20. The authentication unit 120 may include a mobile device authentication unit 122 and a login authentication unit 124.

The mobile device authentication unit 122 may perform a function for authenticating the second device 10. For example, the mobile device authentication unit 122 may request the second device 10 to be authenticated when an application of the second device 10 is executed and thus the second device 10 accesses the authentication server 100 or may authenticate the second device 10 when an authentication request is received from an application of the second device 10 after the application of the second device 10 is executed.

The authentication of the second device 10 may be mobile terminal login authentication over a mobile network. For example, in the authentication of the second device 10, the mobile device authentication unit 122 may send a form in which authentication information for the authentication of the second device 10 can be inputted to the second device 10. When the authentication information is received from the second device 10, the mobile device authentication unit 122 may verify whether the received authentication information is legitimate by querying the database 130 or requesting another mobile authentication server (not shown) associated with the authentication server 100 to verify whether the received authentication information is legitimate. In this case, the authentication information collected from the second device 10 when the second device 10 became a member of the authentication server 100 has been previously stored in the database 130 or another mobile authentication server. In the verification, if the authentication information is determined to be legitimate, the mobile device authentication unit 122 may notify the second device 10 that the authentication has been successful. The authentication information may include user information, a password, an authentication certificate and/or a telephone number.

The mobile device authentication unit 122 requests the telephone number of the second device 10 from the second device 10 for the mobile terminal authentication of the second device 10. When the telephone number is received from the second device 10, the mobile device authentication unit 122 may send authentication code to the telephone number and request the second device 10 to input the sent authentication code. In this case, when the authentication code is received from the second device 10, the mobile device authentication unit 122 may determine whether the received authentication code is identical with the sent authentication number. If, as a result of the determination, it is determined that the received authentication code is identical with the sent authentication number, the mobile device authentication unit 122 may consider the second device 10 to be a device used by a legitimate user and authenticate the second device 10 as a legitimate device.

The authentication of the second device 10 by the mobile device authentication unit 122 may be performed whenever the application of the second device 10 is executed and the second device 10 accesses the authentication server 100. In some embodiments, the authentication of the second device 10 by the mobile device authentication unit 122 may be performed through a simple procedure, such as automatic login in a mobile state, for example, after the mobile device authentication unit 122 authenticates the second device 10 based on the processes.

The login authentication unit 124 sends login information item input windows in which login information may be inputted to the first device 20. The login information item input windows may include a user ID input window and a password input window. A user may input login information to the first device 20 by inputting information to the login information item input windows in such a way as to press keys of a keyboard, that is, the input unit 20a.

The login authentication unit 124 may receive login information from the first device 20 and authenticate the login information based on input timing information received from the first device 20 through the first communication unit 112 and audio information received from the second device 10 through the second communication unit 114. As described above, the input timing information may be timing when the letters of at least some of login information are inputted. The letters of the at least some of the login information may be two or more letters included in a user ID, for example. The audio information may be audio information about a typing sound obtained when a user types the letters of the at least some of the login information.

The input timing information may be letter input detection signals transmitted from the first device 20 to the authentication server 100 whenever a letter is inputted to at least one login information item input window when a user inputs login information using the input unit 20a. For example, the first device 20 may send a letter input detection signal (e.g., a keyboard action signal), generated when a corresponding login information item is inputted to at least one login information item input window, to the authentication server 100 in real time whenever the letter input detection signal is generated. In this case, the login authentication unit 124 may generate first letter input timing pattern information indicative of timing when letters corresponding to a user ID are inputted based on letter input detection signals received from the first device 20 in real time.

In some embodiments, the first letter input timing pattern information may be generated by the first device 20 and transferred to the authentication server 100. That is, in accordance with another embodiment of the present invention, the input timing information may be first letter input timing pattern information generated by the first device 20. In this case, an application for generating first letter input timing pattern information based on a letter input detection signal generated when at least one login information item, for example, a user ID is inputted and sending the first letter input timing pattern information to the authentication server 100 may have been installed in the first device 20. In this case, the login authentication unit 124 may use first letter input pattern information, received from the first device 20, when verifying the user ID.

The login authentication unit 124 may generate second letter input pattern information corresponding to a user ID based on audio information received from the second device 10 and compare the second letter input pattern information with first letter input pattern information. If, as a result of the comparison, the first letter input pattern information is found to be identical with the second letter input pattern information according to a predetermined criterion, the login authentication unit 124 may consider that the user ID inputted to the first device 20 has been inputted by a legitimate user and authenticate the first device 20 by comparing login information received from the first device 20 with login information previously stored in the database 130. Accordingly, the first device 20 may log in to a web service by the authentication server 100.

If, as a result of the comparison, the first letter input pattern information is found to be not identical with the second letter input pattern information or the second letter input pattern information is not received from the second device 10 within a predetermined time, the login authentication unit 124 may send an error message to the first device 20.

The database 130 of the authentication server 100 stores data for the authentication of the first device 20 and the second device 10. For example, the database 130 may have stored authentication-related information for login, which was received when each of the first device 20 and the second device 10 became a member.

The secure login system according to an embodiment of the present invention has been described above. A secure login method based on the secure login system according to an embodiment of the present invention is described below. Operations, relationships, and data flows between the elements of the secure login system may become more evident through the following description.

Figure 3:
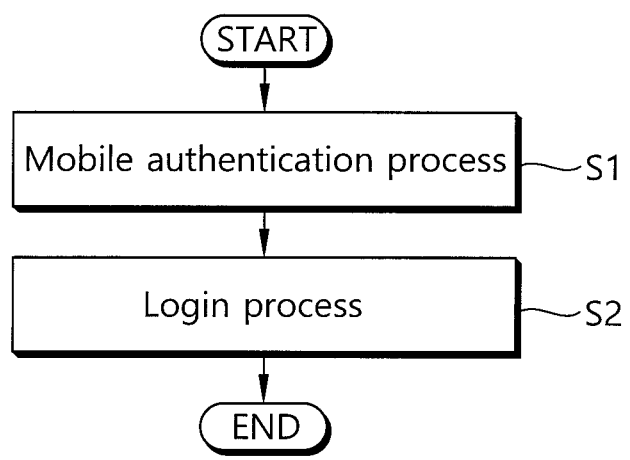
FIG. 3 is a flowchart illustrating a flow of a secure login method according to an embodiment of the present invention.

FIG. 3 is a flowchart illustrating a flow of a secure login method according to an embodiment of the present invention.

As shown in FIG. 3, the secure login method according to an embodiment of the present invention may include a mobile authentication process (step: S1) for performing the mobile authentication of the second device 10, for example, a smart phone and a login process (step: S2) for performing secure login for the first device 20. The steps are described in more detail below.

Figure 4:
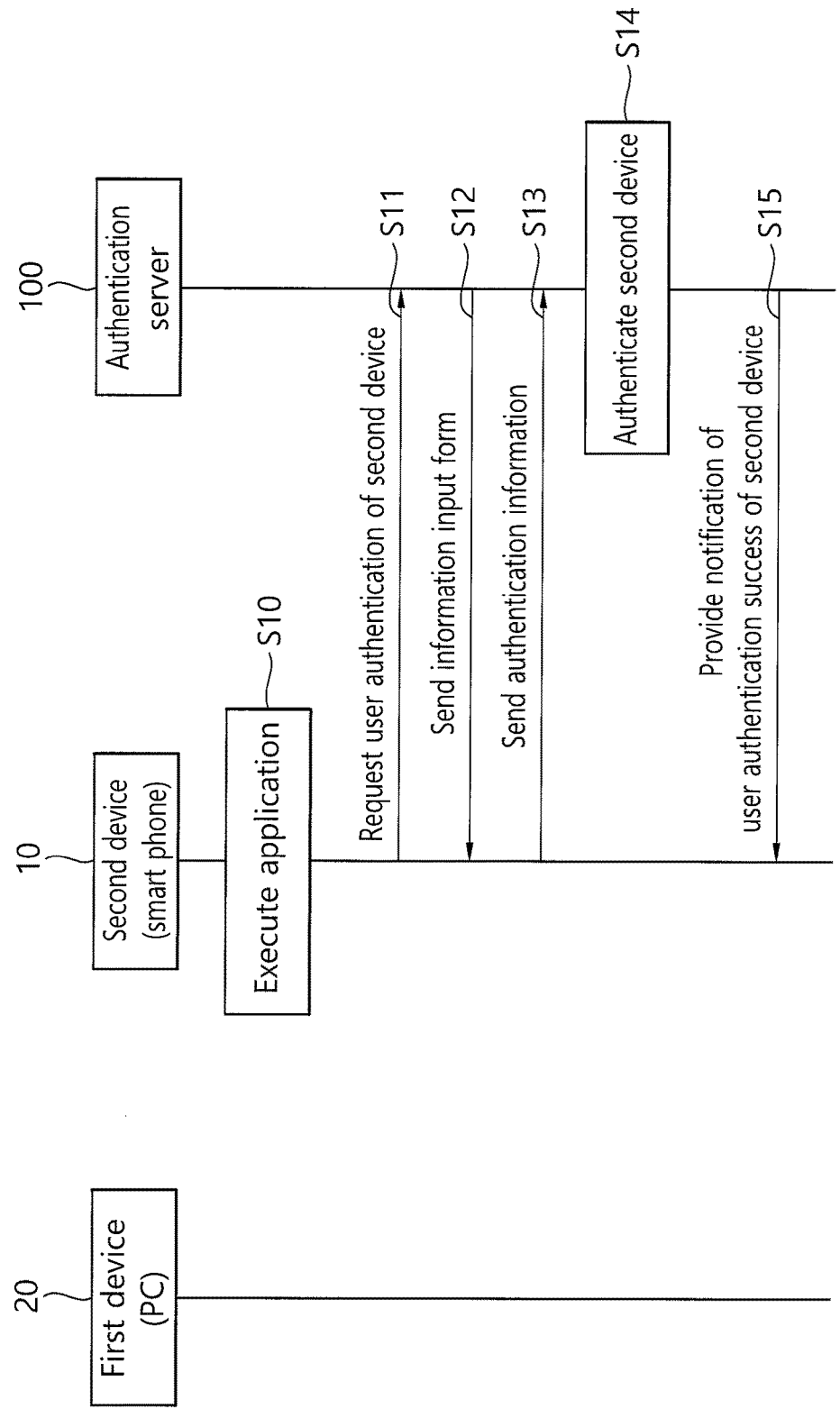
FIG. 4 is a flowchart illustrating a flow of a mobile authentication process according to an embodiment of the present invention.

FIG. 4 is a flowchart illustrating a flow of the mobile authentication process according to an embodiment of the present invention.

As shown in FIG. 4, when an application installed in the second device 10 is executed (step: S10), the second device 10 may request the authentication server 100 to authenticate the second device 10 (step: S11). That is, mobile authentication is started. As described above, in accordance with another embodiment of the present invention, the start of the mobile authentication may be performed in response to a request from the authentication server 100 when the application of the second device 10 is executed and the second device 10 accesses the authentication server 100.

Next, the authentication server 100 may send an information input form in which information for authentication can be inputted to the second device 10 (step: S12). Accordingly, the information input form is displayed on the second device 10. When a user inputs information to the second device 10 according to the information input form, the second device 10 may send authentication information to the authentication server 100 (step: S13).

The authentication server 100 may authenticate the second device 10 using the authentication information received from the second device 10 (step: S14). For example, when the authentication information is received from the second device 10, the authentication server 100 may verity whether the received authentication information is legitimate by querying the database 130 or requesting another mobile authentication server associated with the authentication server 100 to verity whether the received authentication information is legitimate. The database 130 or another mobile authentication server has previously stored and managed the authentication information received from the second device 10 when the second device 10 became a member of the authentication server 100. If, as a result of the verification, the authentication information is found to be legitimate, the authentication server 100 may notify the second device 10 that the authentication has been successful (step: S15). The authentication information may be user information, a password, an authentication certificate and/or a telephone number.

When the second device 10 is authenticated, the authentication server 100 may generate authentication code corresponding to the second device 10 and send an SMS message, including the authentication code, to the second device 10 using the telephone number of the second device 10. In this case, the second device 10 displays the received SMS message, and a user may input the authentication code included in the SMS message to the second device 10. The second device 10 sends the inputted authentication code to the authentication server 100. In response thereto, the authentication server 100 may determine whether the received authentication code is identical with the transmitted authentication code. If, as a result of the determination, the received authentication code is determined to be identical with the transmitted authentication code, the authentication server 100 may consider the second device 10 to be a device used by a legitimate user and authenticate the second device 10 as a legitimate device.

Such mobile authentication of the second device 10 may be performed whenever an application of the second device 10 is executed and the second device 10 accesses the authentication server 100. In some embodiments, the authentication of the second device 10 may be performed through a simple procedure, such as automatic login in a mobile state or authentication using authentication code, when an application is executed after the authentication server 100 authenticates the second device 10 according to a mobile authentication process.

Figure 5:
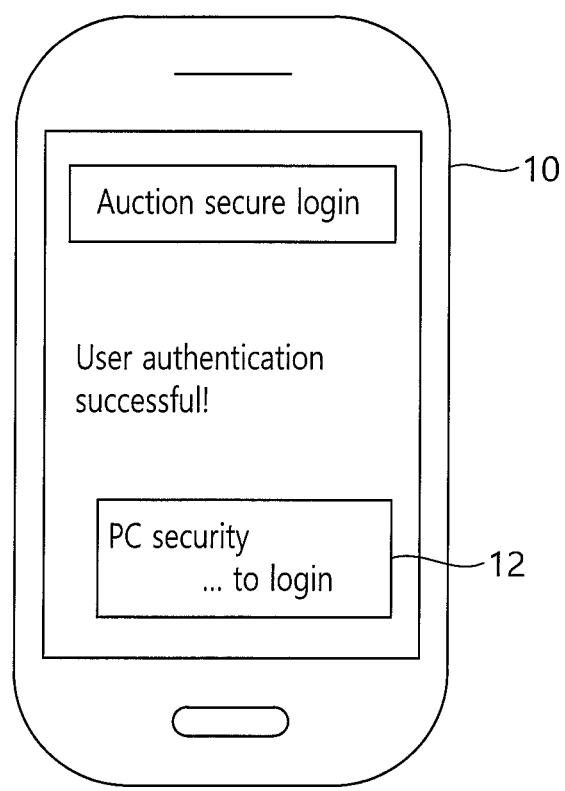
FIG. 5 is an exemplary diagram showing a user interface displayed on a second device in the state in which the authentication of the second device has been completed.

FIG. 5 is an exemplary diagram showing a user interface displayed on the second device 10 in the state in which the authentication of the second device 10 has been completed.

As shown in FIG. 5, words meaning that the authentication of the second device 10 has been completed may be displayed on one side of a screen of the second device 10. For example, words, such as "user authentication has been successful", may be displayed on one side of a screen of the second device 10. An icon 12 for executing an operation of the second device 10 for the secure login of the first device 20 may be displayed on the other side of the screen of the second device 10. When a user selects the icon, a function for recording a typing sound of the first device 20 and sending the typing sound to the authentication server 100 is performed.

Figure 6:
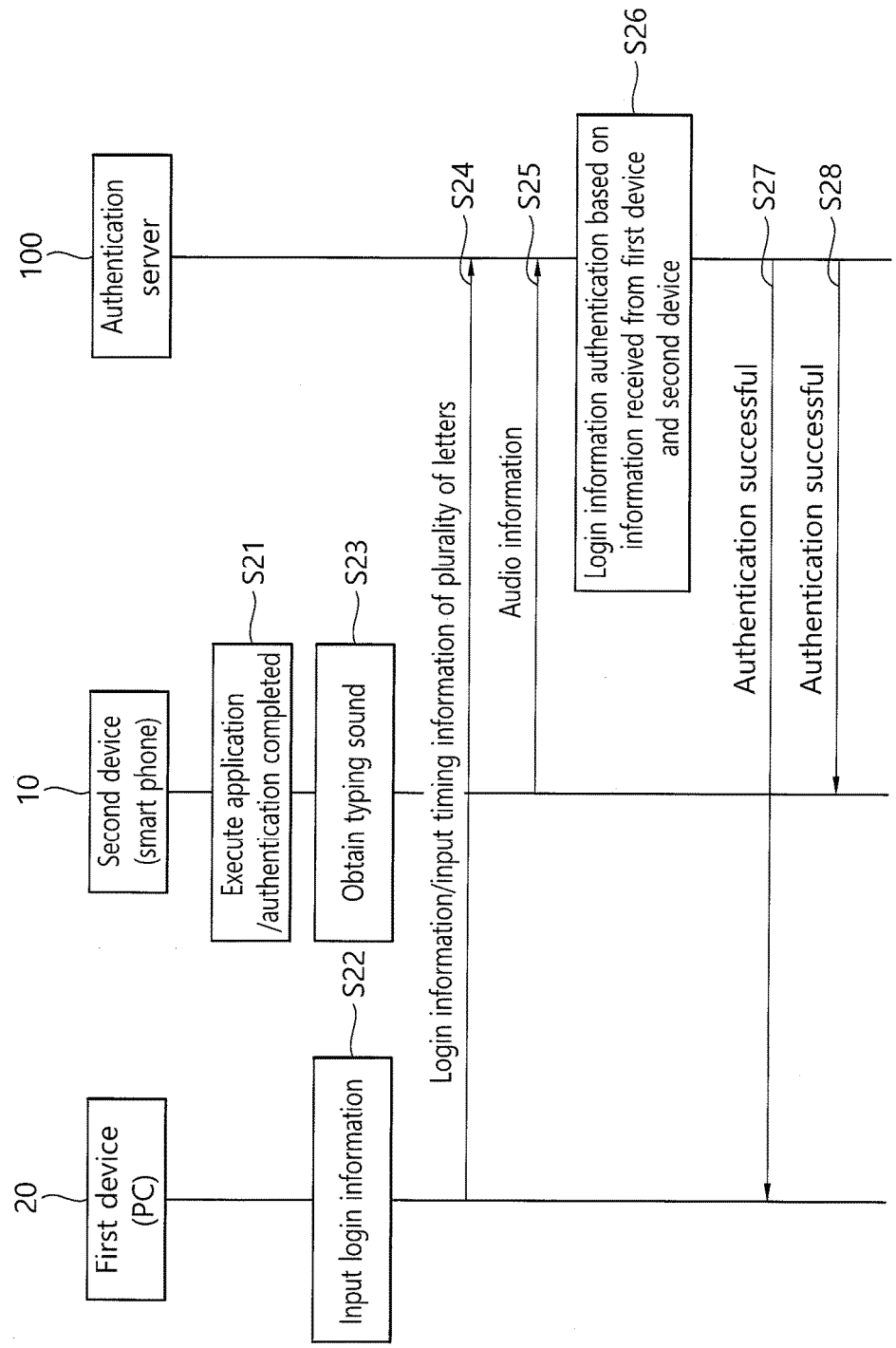
FIG. 6 is a flowchart illustrating a flow of a login process according to an embodiment of the present invention.
Figure 7:
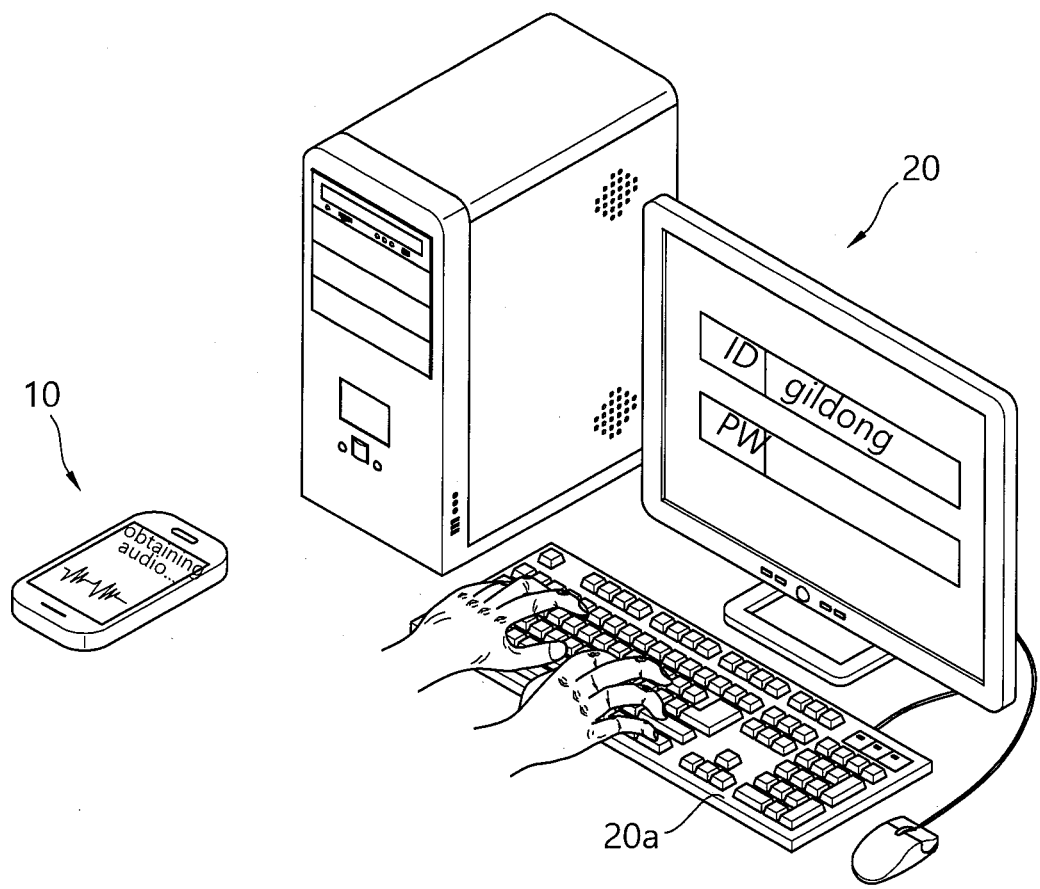
FIG. 7 is an exemplary diagram illustrating the state in which a user inputs login information to a first device for secure login.

FIG. 6 is a flowchart illustrating a flow of the login process according to an embodiment of the present invention, and FIG. 7 is an exemplary diagram illustrating the state in which a user inputs login information to the first device 20 for secure login.

As shown in FIG. 6, first, a user wants to receive a web service using his or her own PC, that is, the first device 20. That is, the user tries to log in to the web service using the first device 20 in the name of the user in order to use the differentiated web service provided to a log-in user. The authentication server 100 associated with the web service is responsible for the login authentication of the web service.

The authentication server 100 sends a form in which login information for the login authentication of the first device 20 can be inputted to the first device 20. The login information may include login information items, such as a user ID and a password. The form may include login information item input windows in which login information items can be inputted. For example, the form may include a user ID input window and a password input window.

When the form is received from the authentication server 100, the first device 20 displays the received form on a screen. For example, the first device 20 may display a user ID input window and a password input window in which a user ID and a password can be inputted, as shown in FIG. 7. In this case, the first device 20 may display words, requesting the second device 10 to execute an application and to obtain a typing sound, in response to a request from the authentication server 100.

Accordingly, the user brings the second device 10 to a place close to the first device 20, as shown in FIG. 7, for example. The user executes the application of the second device 10. The application of the second device 10 accesses the authentication server 100. The second device 10 is authenticated through the exchange of information with the authentication server 100, for example, based on the aforementioned mobile authentication process (step: S21).

When the execution of the application of the second device 10 and the authentication of the second device 10 are completed, the second device 10 prepares to obtain a sound generated when the input unit 20a of the first device 20 is used and may display a request message to request login information to be inputted to the first device 20.

In response thereto, the user types login information using the input unit 20a of the first device 20, for example, a keyboard. The login information is inputted to the first device 20 (step: S22). The login information may include a user ID and a password, for example. For example, the user may input "gildong", that is, a user ID, using the keyboard, as shown in FIG. 7.

The first device 20 may send the received login information and input timing information indicative of timing when letters corresponding to at least some of the login information are inputted to the authentication server 100 (step: 24). The letters corresponding to the at least some of the login information may be letters included in the user ID, for example.

For example, the first device 20 may send a letter input detection signal to the authentication server 100 in real time whenever each of the letters included in the user ID is inputted to the user ID input window when the user types each of the letters of the user ID using the keyboard.

For example, assuming that the user ID is "gildong", first, when the user types "g" and "g" is written in the user ID input window, the first device 20 may send a letter input detection signal, indicating that the input of "g" has been detected, to the authentication server 100. Next, when the user types "i" in 0.1 second and "i" is written in the user ID input window, the first device 20 may send a letter input detection signal, indicating that the input of "i" has been detected, to the authentication server 100. Next, when the user types "1" in 0.14 second and "1" is written in the user ID input window, the first device 20 may send a letter input detection signal, indicating that the input of "1" has been detected, to the authentication server 100. Next, when the user types "d" in 0.2 second and "d" is written in the user ID input window, the first device 20 may send a letter input detection signal, indicating that the input of "d" has been detected, to the authentication server 100. Next, when the user types "o" in 0.15 second and "o" is written in the user ID input window, the first device 20 may send a letter input detection signal, indicating that the input of "o" has been detected, to the authentication server 100. Next, when the user types "n" in 0.1 second and "n" is written in the user ID input window, the first device 20 may send a letter input detection signal, indicating that the input of "n" has been detected, to the authentication server 100. Next, when the user types "g" in 0.2 second and "g" is written in the user ID input window, the first device 20 may send a letter input detection signal, indicating that the input of "g" has been detected, to the authentication server 100.

When the letter input detection signals are received in real time, the authentication server 100 may generate first letter input pattern information indicative of timing when a predetermined number of letters included in the user ID were inputted based on the received letter input detection signals. The first letter input pattern information is compared with second letter input pattern information generated based on audio information received from the second device 10. In this case, the letter input pattern information includes input time interval between the letters. For example, the letter input pattern information may be information indicating that "i" has been inputted after 0.1 second since "g" was inputted, "1" has been inputted after 0.14 second, "d" has been inputted after 0.2 second, "o" has been inputted after 0.15 second, "n" has been inputted after 0.1 second, and "g" has been inputted after 0.2 second.

In accordance with another embodiment of the present invention, the first device 20 may generate the first letter entry pattern information and send it to the authentication server 100. In this case, the first device 20 may generate first letter input timing pattern information based on the letter detection signals generated when the predetermined number of letters included in the user ID are inputted and transfer the first letter input timing pattern information to the authentication server 100.

When the input of the login information is completed and the user requests the submission of the login information (e.g., selects a "submission" icon), the first device 20 sends the inputted login information, for example, a user ID and a password to the authentication server 100.

In some embodiments, while the user types the letters using the input unit 20*a* in order to input the login information, the second device 10 obtains corresponding typing sounds (step: S23). In general, since a login information item that belongs to login information items and corresponds to a user ID is first inputted, the second device 10 may record sounds from a first typing sound to a typing sound corresponding to a predetermined number of letters. For example, assuming that a user ID is "gildong", the second device 10 may obtain sounds generated from the keyboard so that sounds from a first typing sound to a seventh typing sound are included in audio information.

That is, the number of typing sounds obtained by the second device 10 may be determined by taking into consideration the maximum permissible limit of the number of letters which may be used as a user ID. For example, the number of typing sounds obtained by the second device 10 may be determined to be equal to or greater than the maximum permissible limit of the number of letters which may be used as the user ID, but this is only an example of an embodiment. For example, the number of pieces of letter input timing of input typing information transmitted from the first device 20 to the authentication server 100 and the number of typing sounds obtained by the second device 10 may not be necessarily greater than the number of letters included in a user ID and may be set in various ways depending on an implementation environment.

Next, the second device 10 may send the audio information, including the obtained typing sounds, to the authentication server 100 (step: S25). The authentication server 100 may first verify whether the login information received from the first device 20 has been inputted by a reliable user based on the input timing information received from the first device 20 and the audio information. If there is no problem in the verification, the authentication server 100 may authenticate the first device 20 by querying the database 130 about the login information (step: S26). Furthermore, the authentication server 100 may send messages, providing notification of an authentication success, to the first device 20 and the second device 10 (step: S27-S28).

Figure 8:
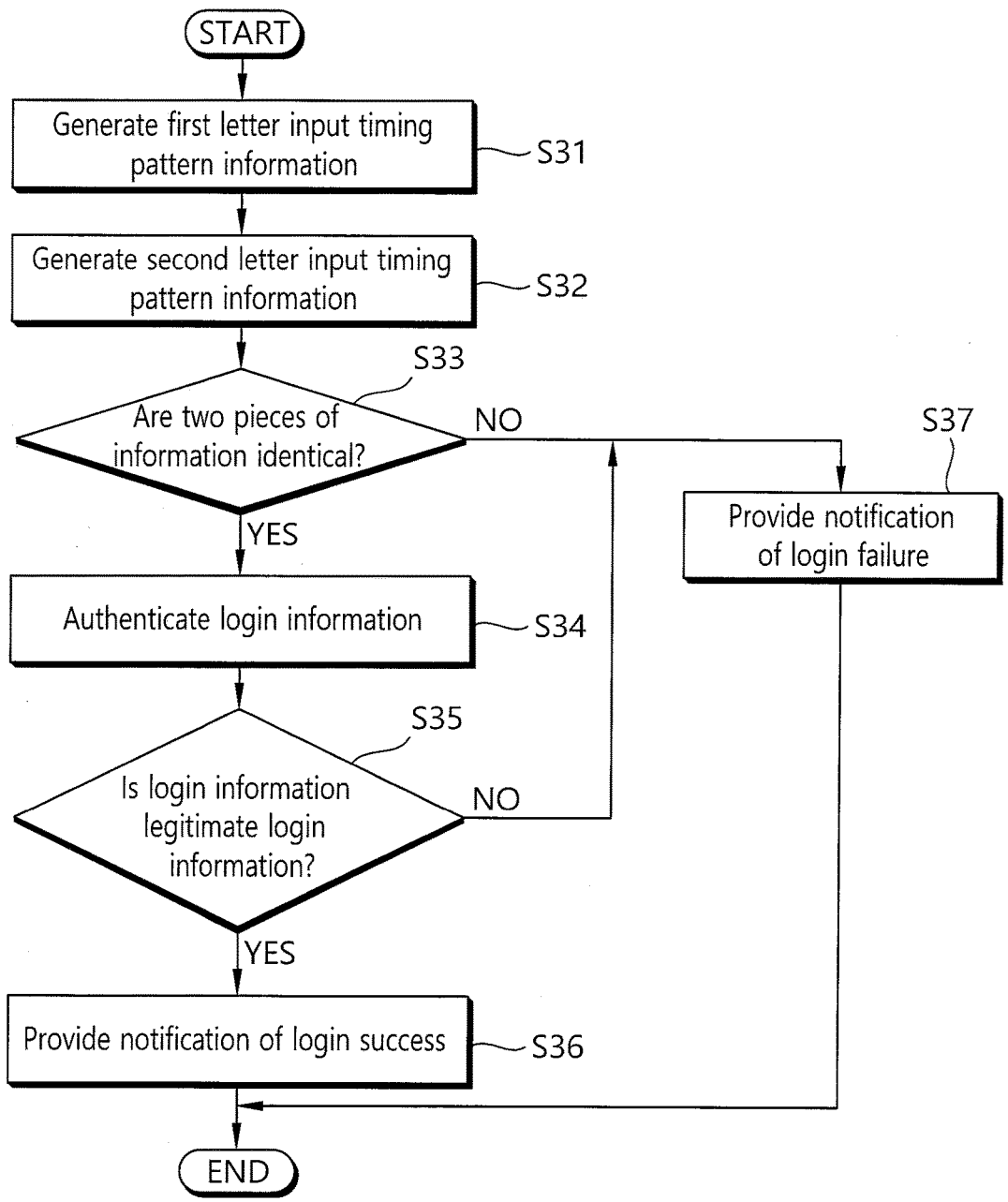
FIG. 8 is a flowchart illustrating a flow of the authentication procedure of the second device, which is performed by the authentication server.

FIG. 8 is a flowchart illustrating a flow of the authentication procedure of the second device 10, which is performed by the authentication server 100.

As shown in FIG. 8, the authentication server 100 may generate first letter input timing pattern information based on input timing information received from the first device 20 (step: S31). For example, the first letter input pattern information may be information indicating that "i" has been inputted after 0.1 second since "g" was inputted, "l" has been inputted after 0.14 second, "d" has been inputted after 0.2 second, "o" has been inputted after 0.15 second, "n" has been inputted after 0.1 second, and "g" has been inputted after 0.2 second through the input unit 20*a* of the first device 20. In accordance with another embodiment of the present invention, if the first device 20 generates the first letter input timing pattern information and sends it to the authentication server 100, step S31 may be omitted.

In some embodiments, the authentication server 100 may generate second letter input timing pattern information by analyzing the waveform of audio information received from the second device 10 (step: S32). If login information has been inputted by a legitimate user, second letter input timing pattern information that is generated may be information indicating that "i" has been inputted after 0.1 second since "g" was inputted, "1" has been inputted after 0.14 second, "d" has been inputted after 0.2 second, "o" has been inputted after 0.15 second, "n" has been inputted after 0.1 second, and "g" has been inputted after 0.2 second, for example, through the input unit 20*a* of the first device 20.

Next, the authentication server 100 may determine whether first letter input pattern information and second letter input pattern information are the same within a predetermined permissible range according to a predetermined criterion by comparing them (step: S33). For example, the authentication server 100 may compare an input time interval between at least two letters included in the first letter input pattern information with an input time interval between corresponding two letters included in the second letter input pattern information and determine whether the two input time intervals are the same within a predetermined permissible range. Furthermore, if the input time interval between the at least two letters of the first letter input pattern information and the input time interval between the corresponding two letters of the second letter input pattern information are determined to be the same within the permissible range, the authentication server 100 may consider that the login information has been inputted by a legitimate user.

The authentication server 100 may calculate each input time interval between the letters based on the input timing information received from the first device 20, may calculate the wavelength of a sound source based on the audio information received from the second device 10, and may consider that a legitimate user has attempts login if the input time interval between the letters and the length of the wavelength of the sound source are proportional to each other.

Figure 9:
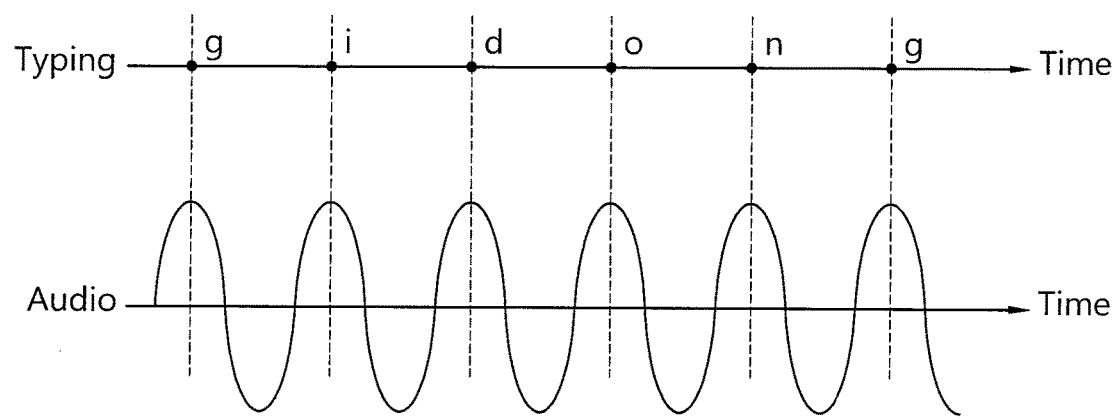
FIG. 9 is an exemplary diagram showing input timing information and the waveform of typing sounds when a legitimate user inputs login information.

FIG. 9 illustrates input timing information and the waveform of typing sounds when a legitimate user inputs login information. As shown in FIG. 9, the input typing pattern of letters through the input unit 20*a* of the first device 20 is identical with the waveform of corresponding typing sounds.

If the first letter input timing pattern information is identical with the second letter input timing pattern information according to the predetermined criterion, the authentication server 100 queries the database 130 about the login information received from the first device 20. If login information stored in the database 130 is identical with the received login information, the authentication server 100 authenticates the login success of the first device 20 (step: S34-S35). Furthermore, the authentication server 100 notifies the first device 20 and the second device 10 that login has been successful (step: S36).

If the first letter input timing pattern information is not identical with the second letter input timing pattern information, the authentication server 100 may determine that the login authentication has failed and send a message, proving notification of a login failure, to the first device 20 and the second device 10 (step: S37). Furthermore, if second letter input timing pattern information has not received from the second device 10, the authentication server 100 may determine that the login authentication has failed and send a message, proving notification of a login failure, to the first device 20 or the second device 10.

The secure login method, apparatus, and system according to embodiments of the present invention have been described above. In accordance with an embodiment of the present invention, login access by an illegal user or illegal program can be easily blocked because whether input timing information by the first device 20 is identical with typing sounds obtained by the second device 10 when login information is inputted is verified prior to the authentication of the login information. Accordingly, reliability of login authentication can be significantly improved.

In the aforementioned embodiments, an example in which a user has inputted the 7 letters corresponding to the user ID, that is, "g", "i", "l", "d", "o", "n", and "g", sequentially using the input unit 20*a* of the first device 20 and the second device 10 has obtained the typing sound of the first letter to the typing sound of the seventh letter has been described.

However, such an example is only illustrative. The number of letters to be used for user verification in the authentication of login information may be set to be smaller than the number of letters of a user ID. For example, a user ID is 7 letters "gildong", but the first device 20 may send input typing information about the former 5 letters of the 7 letters to the authentication server 100, and the second device 10 may also obtain only the typing sound of a first letter to the typing sound of a fifth letter and send the obtained typing sounds to the authentication server 100. In this case, the authentication server 100 may perform login authentication based on the input typing information of the 5 letters and the corresponding typing sounds.

The number of letters of input timing information from the first device 20 may be different from the number of letters corresponding to typing sounds obtained by the second device 10. In this case, the authentication server 100 may find corresponding portions by comparing input time intervals between the letters of first letter input pattern information with input time intervals between the letters of second letter input pattern information. For example, it may be assumed that input typing information transmitted from the first device 20 to the authentication server 100 are 7 letters corresponding to a user ID, that is, "g", "i", "l", "d", "o", "n", and "g", and the second device 10 has obtained the typing sound of a first letter to the typing sound of a twentieth letter. In this case, the authentication server 100 may generate first letter input pattern information based on the input timing information of the 7 letters received from the first device 20 and generate second letter input pattern information based on audio information including the typing sounds of the 20 letters received from the second device 10. The authentication server 100 compares the first letter input pattern information with the second letter input pattern information. In this case, the authentication server 100 may find pieces of information that belong to the second letter input pattern information and that corresponds to the first letter input pattern information by analyzing input time intervals between the letters and compare the pieces of information with the first letter input pattern information.

Meanwhile, when login information is inputted, a typing error may be generated or a typing error may be corrected. In this case, verification can be normally performed because the typing error or the correction of a typing error has also been performed by a legitimate user. For example, a user ID is "gildong", but a user may type "g", "i", "j (a typing error)", press "delete key (delete the typing error)", and type "l (correct and input)", "d", "o", "n", and "g", the first device 20 may transfer only input timing up to the 7 letters "g", "i", "j (a typing error)", "delete key (delete the typing error)", "l (correct and input)", "d", and "o" to the authentication server 100, and the second device 10 may obtain the typing sounds of the 9 letters up to "g", "i", "j (a typing error)", "delete key ((delete the typing error)", "l (correct and input)", "d", "o", and "g" and send the obtained typing sounds to the authentication server 100.

In this case, the typing error or the deletion of a typing error may also be used for verification because they are key input performed by a legitimate user. For example, the authentication server 100 may generate first letter input pattern information based on the input timing information of the 7 letters received from the first device 20 and generate second letter input pattern information based on audio information including the typing sounds of the 9 letters received from the second device 10. The authentication server 100 compares the first letter input pattern information with the second letter input pattern information, but may find pieces of information that belong to the second letter input pattern information and corresponds to the first letter input pattern information by analyzing input time intervals between the letters and compare the pieces of information with the first letter input pattern information.

Figure 10:
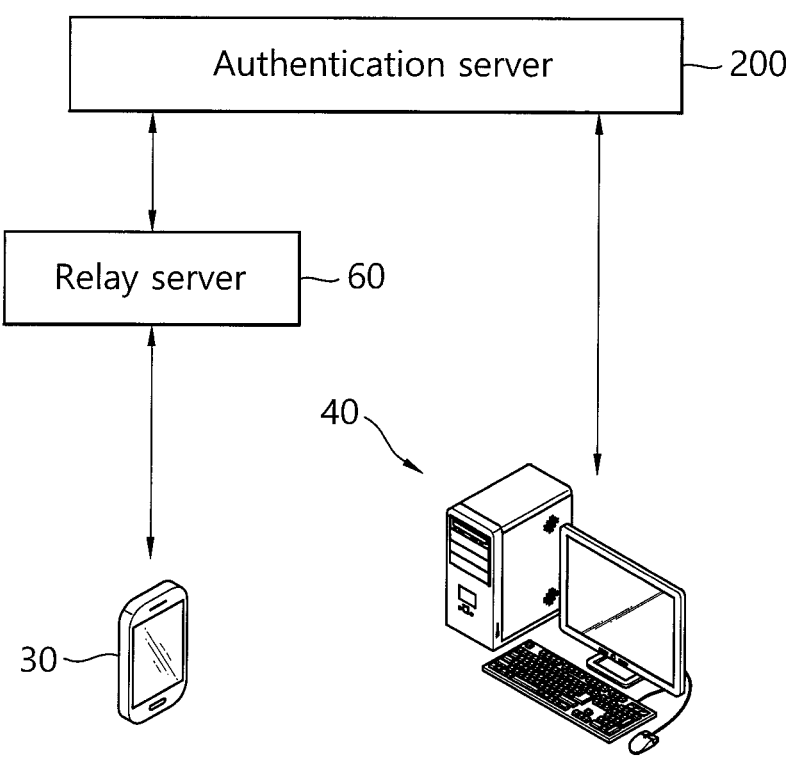
FIG. 10 is a block diagram showing the configuration of a secure login system including a relay server.

A secure login system according to another embodiment of the present invention may further include a relay server. FIG. 10 is a block diagram showing the configuration of the secure login system including a relay server.

As shown in FIG. 10, the secure login system 2 includes an authentication server 200, a first device 40, and a second device 30. A relay server 60 may be provided between the second device 30 and the authentication server 200. The relay server 60 may function to relay signals between the authentication server 200 and the second device 30. For example, the relay server 60 may function to receive an audio information request signal from the authentication server 200, may request audio information from the second device 30 in response to the audio information request signal, and may send the audio information, received from the second device 30, to the authentication server 200.

As described above, in accordance with the embodiments of the present invention, high security can be guaranteed because whether a login attempt is a login attempt by a legitimate user is verified based on timing when the letters of at least some of login information obtained from a plurality of devices when a user logs in are inputted and the login information is then authenticated. For example, in accordance with an embodiment of the present invention, login access by an illegal user or illegal program can be easily blocked because whether input timing information by a first device is identical with a typing sound obtained by a second device when login information is inputted is verified prior to the authentication of the login information. Accordingly, reliability of login authentication can be significantly improved.

While the invention has been shown and described with respect to the preferred embodiments, it will be understood by those skilled in the art that various changes and modifications may be made without departing from the spirit and scope of the invention as defined in the following claims.

What is claimed is:

1. A secure login system, comprising:
an authentication server;
a first device configured to send login information received through an input unit and input timing information indicative of timing when letters corresponding to at least some of the login information are inputted to the authentication server; and
a second device configured to obtain typing sounds generated when a user types the letters using the input unit and to send audio information comprising the typing sounds to the authentication server,
wherein the authentication server authenticates the login information based on the input timing information received from the first device and the audio information received from the second device,
wherein the authentication server compares first letter input timing pattern information generated based on the input timing information received from the first device with second letter input timing pattern information generated based on the audio information received from the second device, and
wherein the authentication server further authenticates the login information by querying a database corresponding to the login information if the first letter input timing pattern information is identical with the second letter input timing pattern information according to a predetermined criterion.

2. The secure login system of claim 1, wherein the first device sends a letter input detection signal indicating that an input of a letter has been detected to the authentication server in real time whenever the input of the letter is detected in at least one login information item input window for inputting the login information when the user presses a key of the input unit.

3. The secure login system of claim 2, wherein the authentication server generates the first letter input timing pattern information of letters corresponding to at least some of the login information based on a plurality of letter input detection signals received from the first device in real time.

4. The secure login system of claim 1, wherein the first device generates the first letter input timing pattern information of letters corresponding to at least some of the login information based on input of the letters detected in at least one login information item input window for inputting the login information when the user presses keys of the input unit and sends the first letter input timing pattern information to the authentication server.

5. The secure login system of claim 1, wherein the authentication server calculates a time interval between at least two letters included in first letter input pattern information and a time interval between corresponding at least two letters included in second letter input pattern information and wherein the authentication server compares the time interval between the at least two letters included in the first letter input pattern information with the time interval between the at least two letters included in the second letter input pattern information.

6. The secure login system of claim 1, wherein the authentication server analyzes a wavelength of the audio information received from the second device and generates the second letter input timing pattern information based on the analyzed wavelength.

7. The secure login system of claim 1, wherein the authentication server further authenticates the second device prior to the input of the login information and wherein the authentication server sends a form indicating that the login information needs to be inputted to the first device after the authentication of the second device is successfully completed.

8. The secure login system of claim 1, wherein the authentication server calculates input time intervals between the letters based on the input timing information received from the first device, calculates a wavelength of a sound source based on the audio information received from the second device, determines that a legitimate user has attempted login if each of the input time intervals between the letters is proportional to a length of the wavelength of the sound source, and attempts to authenticate the login information.

9. The secure login system of claim 1, wherein the letters of at least some of the login information comprise letters inputted to an input window of a user identification (ID) and correspond to a predetermined number.

10. A secure login method, the method comprising:
sending, by a first device, login information received through an input unit of the first device and input timing information indicative of timing when letters corresponding to at least some of the login information are inputted to an authentication server;
obtaining, by a second device, typing sounds generated when a user types the letters using the input unit;
sending audio information comprising the typing sounds to the authentication server; and
authenticating, by the authentication server, the login information based on the input timing information received from the first device and the audio information received from the second device,
comparing, by the authentication server, first letter input timing pattern information generated based on the input timing information received from the first device with second letter input timing pattern information generated based on the audio information received from the second device; and authenticating, by the authentication server, the login information by querying a database corresponding to the login information if the first letter input timing pattern information is identical with the second letter input timing pattern information according to a predetermined criterion.

11. The secure login method of claim 10, further comprising: sending, by the first device, a letter input detection signal indicating that an input of a letter has been detected to the authentication server in real time whenever the input of the letter is detected in at least one login information item input window for inputting the login information when the user presses a key of the input unit.

12. The secure login method of claim 11, the method comprising: generating, by the authentication server, the first letter input timing pattern information of letters corresponding to at least some of the login information based on a plurality of letter input detection signals received from the first device in real time.

13. The secure login method of claim 10, further comprising:
generating, by the first device, the first letter input timing pattern information of letters corresponding to at least some of the login information based on input of the letters detected in at least one login information item input window for inputting the login information when the user presses keys of the input unit; and
sending, by the first device, the first letter input timing pattern information to the authentication server.

14. A secure login apparatus, comprising:
a first communication unit configured to receive login information received through an input unit of a first device and input timing information indicative of timing when letters corresponding to at least some of the login information are inputted from the first device;
a second communication unit configured to receive audio information comprising typing sounds generated when a user types the letters using the input unit from a second device; and
a login authentication unit configured to authenticate the login information based on the input timing information received from the first device and the audio information received from the second device,
wherein the login authentication unit compares first letter input timing pattern information generated based on the input timing information received from the first device with second letter input timing pattern information generated based on the audio information received from the second device; and
wherein the login authentication unit further authenticates the login information by querying a database corresponding to the login information if the first letter input timing pattern information is identical with the second letter input timing pattern information according to a predetermined criterion.

15. The secure login apparatus of claim 14, wherein the first communication unit receives a letter input detection signal indicating that an input of a letter has been detected from the first device in real time whenever the input of the letter is detected in at least one login information item input window for inputting the login information when the user presses a key of the input unit.

16. The secure login apparatus of claim 14, wherein the login authentication unit generates the first letter input timing pattern information of letters corresponding to at least some of the login information based on a plurality of letter input detection signals transmitted from the first device to the first communication unit in real time.

* * * * *